United States Patent
Osato et al.

(10) Patent No.: US 8,442,370 B2
(45) Date of Patent: *May 14, 2013

(54) OPTICAL FIBER CABLE READY FOR MID-SPAN ACCESS

(75) Inventors: Ken Osato, Sakura (JP); Naoki Okada, Yotsukaido (JP); Kouji Tomikawa, Tokyo (JP)

(73) Assignee: Fujikura Ltd., Tokyo (JP)

( * ) Notice: Subject to any disclaimer, the term of this patent is extended or adjusted under 35 U.S.C. 154(b) by 293 days.

This patent is subject to a terminal disclaimer.

(21) Appl. No.: 12/921,112

(22) PCT Filed: Feb. 18, 2009

(86) PCT No.: PCT/JP2009/000683
§ 371 (c)(1),
(2), (4) Date: Sep. 3, 2010

(87) PCT Pub. No.: WO2009/110178
PCT Pub. Date: Sep. 11, 2009

(65) Prior Publication Data
US 2011/0008007 A1    Jan. 13, 2011

(30) Foreign Application Priority Data
Mar. 7, 2008 (JP) .................................. 2008-058629

(51) Int. Cl.
*G02B 6/44* (2006.01)
*G02B 6/00* (2006.01)

(52) U.S. Cl.
USPC .......................................... 385/100; 385/113

(58) Field of Classification Search ............ 385/100, 385/113, 147
See application file for complete search history.

(56) References Cited

U.S. PATENT DOCUMENTS

| | | | |
|---|---|---|---|
| 3,774,365 A * | 11/1973 | Cole et al. ..................... | 428/116 |
| 5,029,974 A * | 7/1991 | Nilsson ......................... | 385/113 |
| 6,052,502 A * | 4/2000 | Coleman ....................... | 385/114 |
| 6,236,790 B1 * | 5/2001 | Okada et al. .................. | 385/102 |
| 6,973,243 B2 * | 12/2005 | Koyasu et al. ................. | 385/100 |

(Continued)

FOREIGN PATENT DOCUMENTS

| | | |
|---|---|---|
| EP | 0945746 A2 | 9/1999 |
| EP | 1006385 A1 | 6/2000 |

(Continued)

OTHER PUBLICATIONS

Office Action issued by Japanese Patent Office in Japanese Application No. 2008-058629 dated Feb. 5, 2013.

(Continued)

*Primary Examiner* — Akm Enayet Ullah
(74) *Attorney, Agent, or Firm* — Sughrue Mion, PLLC

(57) ABSTRACT

An optical fiber cable is comprised of: a slotted core elongated along an axis of the optical fiber cable, the slotted core including a slot running in parallel with the axis and a groove accessible through the slot; one or more optical fibers placed in the groove; a sheath enclosing the slotted core and the optical fibers; a bonding portion where the slotted core is bonded with the sheath; a first strength member embedded in the slotted core and running in parallel with the axis; and a second strength member embedded in the sheath and running in parallel with the axis, wherein the first and second strength members are aligned on a plane including the axis.

15 Claims, 9 Drawing Sheets

U.S. PATENT DOCUMENTS

| | | | |
|---|---|---|---|
| 8,238,706 B2* | 8/2012 | Kachmar | 385/100 |
| 2011/0002588 A1* | 1/2011 | Osato et al. | 385/113 |
| 2012/0051702 A1* | 3/2012 | Blazer et al. | 385/113 |

FOREIGN PATENT DOCUMENTS

| | | |
|---|---|---|
| FR | 2534385 A1 | 4/1984 |
| FR | 2562272 A1 | 10/1985 |
| JP | 62-291608 A | 12/1987 |
| JP | 03-209408 A | 9/1991 |
| JP | 05-088056 A | 4/1993 |
| JP | 06-050009 U | 7/1994 |
| JP | 08-211261 A | 8/1996 |
| JP | 10-115750 A | 5/1998 |
| JP | 2006-003774 A | 1/2006 |
| JP | 2007-115636 A | 5/2007 |

OTHER PUBLICATIONS

Ken Osato et al., New Design of Optical Cable for Easy Mid-span Access, 56th IWCS Conference, Nov. 2007, pp. 225-229.

* cited by examiner

OPTICAL FIBER CABLE READY FOR MID-SPAN ACCESS

TECHNICAL FIELD

Apparatuses consistent with the present invention relate to optical fiber cables enclosing fibers, in which enclosed fibers are easily accessible but prevented from damage.

BACKGROUND ART

An optical fiber cable in some cases includes plural fibers for the purpose of increasing the capacity or the number of devices linking via the cable. These fibers may be enclosed with a slotted core and the slotted core along with the fibers may be further enclosed with a sheath.

After being laid, some optical fiber cables are often subject to a work named "mid-span access" to make the enclosed optical fibers branch off. In the mid-span access work, the sheath and the core are cut and split to enable access to one or more of the enclosed fibers. Japanese Patent Unexamined Application Publications Nos. S62-291608, H06-50009 and H08-211261 disclose related arts of optical fiber cables.

DISCLOSURE OF INVENTION

Technical Problem

Some circumstances cause damage to properties of the optical fibers. For example, as the slotted core is likely to move relative to the sheath, projection of the slotted core out of one end of the sheath may occur. The projection will lead to damage to the optical fibers at the projecting part. Further, curving or meandering may generate compression or tensile stress on the optical fibers, which causes increase in transmission loss. Certain embodiments of the present invention provide optical fiber cables enclosing fibers, in which enclosed fibers are easily accessible but prevented from damage.

Technical Solution

An optical fiber cable according to an aspect of the present invention has an axis. The optical fiber cable is comprised of: a slotted core elongated along an axis of the optical fiber cable, the slotted core including a slot running in parallel with the axis and a groove accessible through the slot; one or more optical fibers placed in the groove; a sheath enclosing the slotted core and the optical fibers; a bonding portion where the slotted core is bonded with the sheath; a first strength member embedded in the slotted core and running in parallel with the axis; and a second strength member embedded in the sheath and running in parallel with the axis, wherein the first and second strength members are aligned on a plane including the axis.

BEST MODE FOR CARRYING OUT THE INVENTION

Exemplary embodiments of the present invention will be described hereinafter with reference to the appended drawings. While optical fiber cables according to the embodiments are elongated along a central axis C thereof, FIGS. 1, 4-9, 11-13 only show cross sections thereof taken along a plane perpendicular to the central axis. The following descriptions and the appended drawings often refer rectangular coordinates represented by X- and Y-axes on these sectional planes for convenience of explanation. These X- and Y-axes and elements related thereto sometimes represent planes and bodies elongated along the central axis C.

Figure 1:
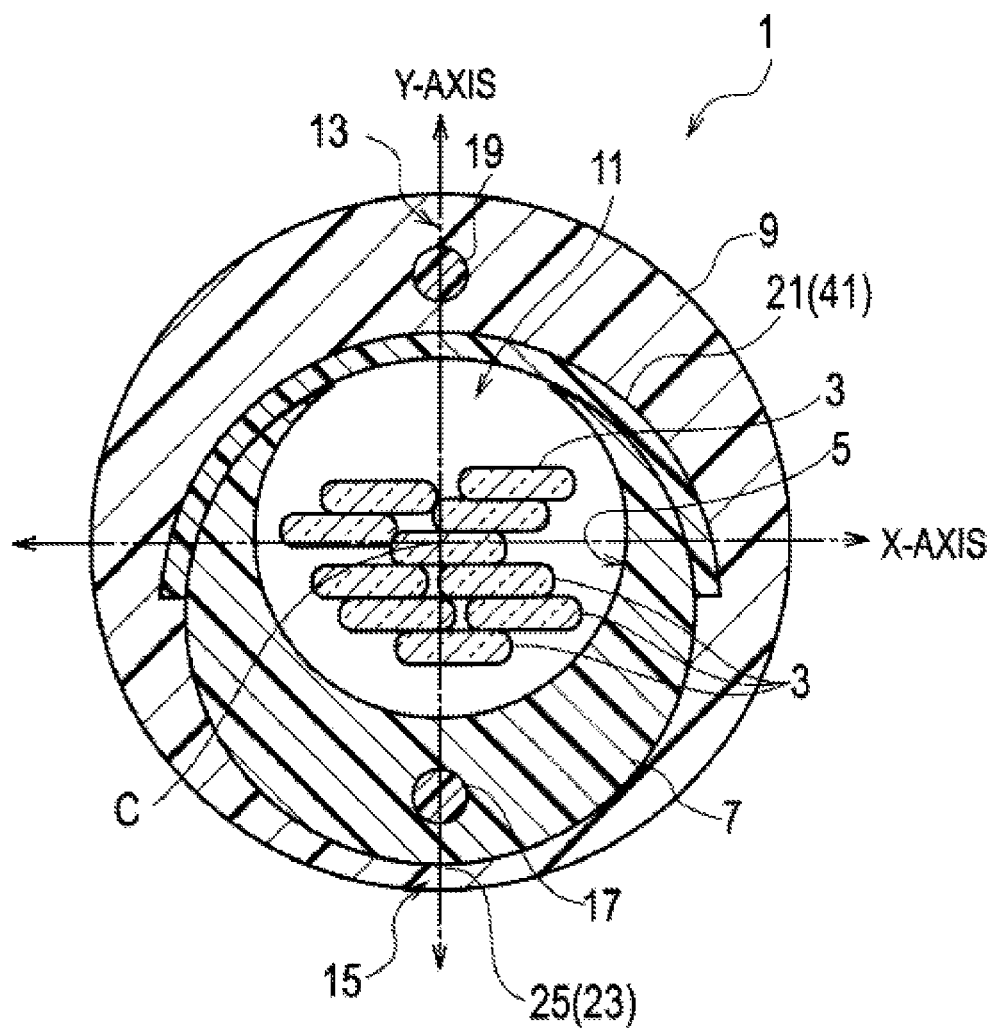
FIG. 1 shows a cross section of an optical fiber cable according to a first embodiment of the present invention.

Referring to FIG. 1, an optical fiber cable 1 according to a first embodiment of the present invention is comprised of optical fibers 3, a slotted core 7 having a groove 5 for housing the optical fibers 3, and a sheath 9 enclosing the slotted core 9 along with the optical fibers 3. Needless to say, all the fibers 3, the groove 5, the core 7, the sheath 9 and the slot 11 run in parallel with the central axis C of the optical fiber cable 1.

The slotted core 7 is further comprised of a slot 11 opened linearly along the slotted core 7 for enabling access to the interior of the groove 5. Therefore the slotted core 7 has a C-letter cross sectional shape. The wall of the slotted core 7 gradually becomes thicker toward the side opposite to the slot 11. The groove 5 is eccentric from the outer profile of the slotted core 7. When the center of the slot 11 and the side just opposite to the slot 11 are made aligned on the Y-axis, the eccentricity is also in a direction along the Y-axis.

The sheath 9 preferably consists of any proper resin such as polyethylene. The sheath 9 in comprised of a nonuniform wall which gradually becomes thinner from a thickest wall portion 13 toward a thinnest wall portion 15, both of which are aligned on the Y-axis. Thereby eccentricity in the direction along the Y-axis is given to a hollow defined by the wall relative to the outer profile of the sheath 9. The thickest wall portion 13 covers the slot 11.

As the eccentricity of the groove 5 relative to the slotted core 7 is just reverse to the eccentricity of the hollow of the sheath 9, the groove 5 is resultantly substantially concentric with the central axis C of the optical fiber cable 1. Alternatively, the groove 5 may be slightly eccentric from the central axis C in either direction along the Y-axis.

The slotted core 7 is further comprised of a strength member 17 embedded therein at the thickest wall portion 13. Further, the sheath 9 is also comprised of a strength member 19 embedded therein at the thickest portion thereof. Both the strength members 17 and 19 are aligned on the plane including both the Y-axis and the central axis C of the cable 1. Further, the strength member 17 is in nature opposite to the strength member 19 with respect to the central axis C. The strength members 17 and 19 may be formed in various shapes such as a line, a strip, an elongated multilateral prism or a column. The number of the strength members 17 and 19 is not limited to two and may be three or more.

The strength members 17 and 19 are made of any material reinforcing the optical fiber cable 1 against tensile force, such as steel or FRP (Fiber Reinforced Plastic), and in general have greater stiffness than those of the other members. As the strength members 17 and 19 having such stiffness are aligned on the plane, when the optical fiber cable 1 is curved, this plane functions as a neutral surface in a meaning of mechanics (a surface along which material is neither compressed nor extended). This tendency is quite strong because the strength members 17 and 19 are disposed on the other sides of the optical fiber cable 1 at a distance from each other.

In any case, the strength members 17 and 19 may be aligned on another plane. Even then, if the optical fibers 3 are disposed around the plane, increase in transmission loss can be suppressed as will be discussed later.

Although the cross sectional shape of the groove 5 is illustrated as a circle in FIG. 1, the shape is not limited thereto and may be an ellipse or any irregular shape instead. Further, the interior of the groove 5 may be either vacant except the optical fibers 3 or filled with any buffer members. In any case, the optical fibers 3 are preferably disposed around the central axis C.

The optical fibers 3 may be any of bare optical fibers, optical fiber cords, and optical fiber ribbons.

An elongate tape 21 preferably made of non-woven fabric or any resin such as PET (PolyEthylene Terephthalate) is attached on the slotted core 7 to cover the slot 11. The elongate tape 21 is not wrapped around the slotted core 7 and leaves a lower part of a surface of the slotted core 7 uncovered. Therefore the sheath 9 may be directly in contact with this lower part of the slotted core 7 while the elongate tape 21 intervenes between the upper part of the slotted core 7 and the sheath 9.

At this uncovered part, the slotted core 7 has a bonding portion 23 where the slotted core 7 is bonded to the sheath 9. The bonding portion 23 longitudinally ranges over the slotted core 7 to form a continuous line or a row of separate portions at intervals. Thermal fusion boding may be applied to bonding at the bonding portion 23. In the present embodiment, a projecting rib 25 projecting from the slotted core 7 is formed in advance of bonding. The projecting rib 25 facilitates thermal fusion bonding with the sheath 9 and, after bonding, becomes the bonding portion 23 fitting in and bonding with a complementary recess of the sheath 9. In any proper case, thermal fusion bonding or any other bonding treatment can be omitted and the projection rib 25 fitting in the recess by itself functions as bond. Preferably the projecting rib 25 does not project out of the sheath 9.

The optical fiber cable 1 may include a rip cord to facilitate splitting the sheath 9.

As already discussed, the plane on which the strength members 17 and 19 are aligned, shown as the Y-axis in FIG. 1, functions as a neutral surface in a meaning of mechanics when the optical fiber cable 1 is curved in any directions perpendicular to the plane (namely, in the direction of the X-axis). Moreover the optical fiber cable 1 may be capable of rotating or twisting and also tendency for the plane to be the neutral surface is relatively strict as discussed above. Thus, even if one would curve the optical fiber cable 1 in a direction deviated from the X-axis, the optical fiber cable 1 would be slightly reoriented to have itself curved in the X-axis and then the plane including the central axis C still functions as a neutral surface. Further, as the optical fibers 3 are disposed around the central axis C (included in the neutral surface), the optical fibers 3 are substantially neither compressed nor extended. Therefore transmission loss caused by compression or tensile stress can be suppressed in a very low level. It is advantageous in view of suppression of transmission loss particularly when some circumstances force a laid optical fiber cable to curve or meander.

As the sheath 9 has a nonuniform wall in which the thickest wall portion 13 having the strength member 19 covers the slot 11, mechanical strength in this part is reinforced. This is advantageous in view of prevention of damage to the enclosed optical fibers 3 when external force is applied to the sheath 9, in particular over the slot 11. This effect becomes remarkable when the thickness of the thickest wall portion 13 is 1.5 times or more of the thickness of the thinnest wall portion 15.

Without the bonding portion 23, the slotted core 7 is likely to move in its longitudinal direction because temperature change after laying the optical fiber cable 1 may cause thermal expansion or contraction. Further, some manners of handling of the optical fiber cable 1 may cause rotational displacement of the slotted core 7 relative to the sheath 9. As the sheath 9 and the slotted core 7 are bonded together at the bonding portion 23, the slotted core 7 is prevented from displacement relative to the sheath 9 in both the longitudinal and rotational directions. The bond at the bonding portion 23 effectively prevents projection, retraction and rotational displacement of the slotted core 7. As the bond at the bonding portion 23 prevents such displacement, the optical fiber cable 1 provides prominent facility for handling.

The bond between the slotted core 7 and the sheath 9 is limited in the bonding portion 23. This fact provides facility for the mid-span access work because peeling of the sheath 9 is easily carried out as compared with a case where the core and the sheath are entirely bonded together. In particular, while a cutter is put into the sheath at the beginning of the mid-span access work, the cutter may cut out the projecting rib 25 and therefore simultaneously break the bond between the slotted core 7 and the sheath 9 at the bonding portion 23. Thus workability about the mid-span access work is prominently improved.

Figure 2:
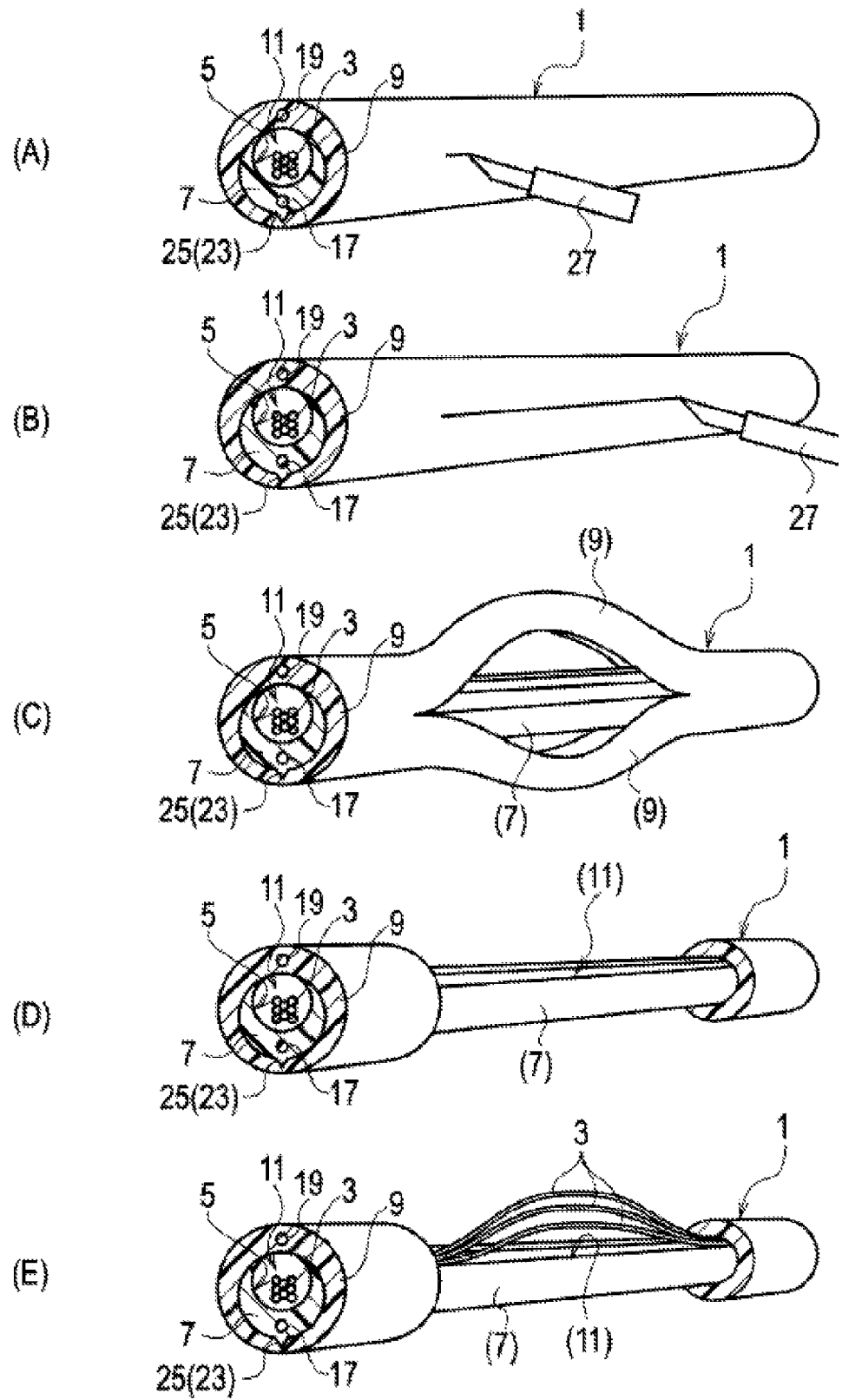
FIGS. 2(A) through 2(E) are drawings explaining a process of mid-span access.

Referring to FIGS. 2(A) through 2(E), a process of mid-span access will be described hereinafter. First, a sharp edge of a cutter 27 is put into both sides of the sheath 9 and made advance along the sheath 9 as shown in FIGS. 2(A) and 2(B). Next this part of the sheath 9 is split into two as shown in FIG. 2(C). Bond at the bonding portion 23 is easily broken in the course of this process. The split parts are respectively cut out by means of nippers or such a tool, whereby exposing a part of the slotted core 7 under the cut-out parts as shown in FIG. 2(D). Then the optical fibers 3 housed in the groove 5 become accessible through the slot 11. One or more of the optical fibers 3 are pull out of the slotted core 7 as shown in FIG. 2(E) and then subject to a branching process. Movement of the cutter 27 along the longitudinal direction is made not on the slot 11 but at both the sides of the sheath 9 where the optical fibers 3 is protected by the sheath 9. Therefore, the optical fibers 3 are not subject to damage.

Figure 3:
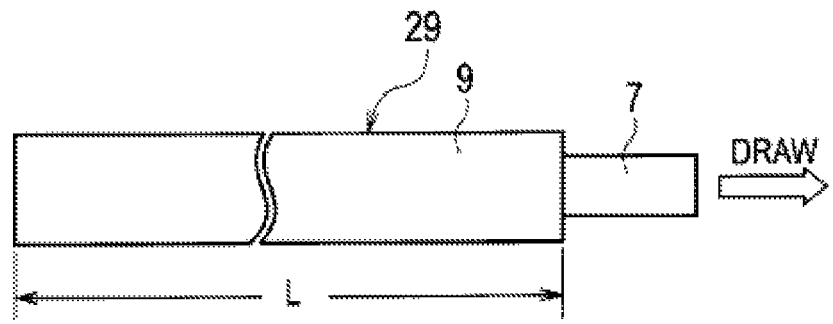
FIG. 3 is a schematic drawing explaining a draw test method.

Table 1 demonstrates test results of some examples in regard to a drawing test, projection length of the slotted core at the end of the sheath, workability about the mid-span access work, and transmission loss. The drawing test had been carried out in a manner shown in FIG. 3, in which a slotted core 7 of a test piece 29 is drawn from a sheath 9 having a length of 400 mm in a speed of 100 mm/min in a direction indicated by an arrow therein and a maximum value of force of drawing is measured.

Meanwhile, the force of drawing is preferably 98N or more in view of prevention of displacement of the slotted core relative to the sheath.

The working example 1 is produced in accordance with the present embodiment. Comparative examples 1-5 are different from the present embodiment in structural parameters as summarized in this table.

slotted core out of the sheath. This means that the slotted core is susceptible to displacement relative to the sheath.

The comparative example 3 is different from the working example 1 in that fixation of the slotted core with the sheath depends only on pressure of the sheath onto the slotted core. This structure results in a relatively large projection length of 5 mm of the slotted core out of the sheath. Further, workability about the mid-span access work is inferior to that of the working example 1. Transmission loss increases up to 0.45 dB/km which is considerably larger than 0.21 dB/km of the working example 1.

The comparative example 4 is different from the working example 1 in that no bond is formed between the slotted core and the sheath and a wrapping made of a tape is wound around

TABLE 1

| | MAIN FEATURES | WORKING EXAMPLE 1 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|
| STRUCTURAL PARAMETERS | FIXATION BETWEEN THE SLOT CORE AND THE SHEATH | PARTIAL | OVERALL ADHESION | NONE THE SLOT BY THE SHEATH | PRESS ON | NONE | NONE |
| | TAPE OR WRAPPING | A TAPE ALONG THE SLOT IN PART, NO WRAPPING | A TAPE ALONG THE SLOT IN PART, NO WRAPPING | A TAPE ALONG THE SLOT IN PART, NO WRAPPING | A TAPE ALONG THE SLOT IN PART, NO WRAPPING | A SPIAL WRAPPING AROUND THE SLOT | A TAPE TOTALLY ALONG THE SLOT, AND A YARN WOUND THEREMOUND |
| EVALUATION | FORCE OF DRAWING THE SLOT CORE (FIG. 3) (SHEATH LENGTH: 40 cm) | 98N OR MORE | 98 N OR MORE | 10 N OR LESS | 98 N OR MORE | 85 N | 20 N |
| | A PROJECTION FROM THE END OF THE SHEATH | NONE (1 mm OR LESS) | NONE (1 mm OR LESS) | A PROJECTION OF 55 mm IN LENGTH | A PROJECTION OF 5 mm IN LENGTH | A PROJECTION OF ABOUT 5 mm IN LENGTH | A PROJECTION OF 36 mm IN LENGTH |
| | WORKABILITY *2 | EXCELLENT | POOR | EXCELLENT | TOLERABLE | TOLERABLE (EXTRA WORK FOR REMOVAL) | TOLERABLE (EXTRA WORK FOR REMOVAL) |
| | TRANSMISSION LOSS (AT THE WAVELENGTH OF 1.55 μm) | 0.21 dB/km | 0.21 dB/km | 0.21 dB/km | 0.45dB/km | 0.23 dB/km | 0.21 dB/km |

* NOTES
EXCELLENT: WORKABLE WITHOUT ANY PROBLEMS AND WITH GREATER FAC LITY THAN EXISTING CABLES
TOLERABLE: WORKABLE WITH CONSIDERABLE LABOR AS COMPARED WITH THAT FOR EXISTING CABLES
POOR: TROUBLESOME IN WORK

As being understood from Table 1, the working example 1 in accordance with the present embodiment has satisfactory properties in that the force of drawing is 98N or more, the projection length is 1 mm or less, and the transmission loss is only 0.21 dB/km while workability about the mid-span access work is excellent.

The comparative example 1 is different from the working example 1 in that the slotted core 7 and the sheath 9 are totally bonded together. Workability about the mid-span access work is inferior to that of the working example 1 because it is considerably laborious to peel off the sheath 9 totally bonded with the slotted core 7.

The comparative example 2 is different from the working example 1 in that no bond is formed between the slotted core and the sheath. This structure results in relatively small force of 10N or less required to draw the slotted core out of the sheath and a relatively large projection length of 55 mm of the the slotted core in a spiral shape. As the wrapping serves for friction against displacement of the slotted core, force of drawing is relatively high, 85N. However, projection length of the slotted core out of the sheath reaches about 5 mm. Further, workability about the mid-span access work is inferior to that of the working example 1 as extra work to remove the wrapping is required. Transmission is relatively low, 0.23 dB/km, although this value is slightly larger than that of the working example 1.

The comparative example 4 is different from the working example 1 in that no bond is formed between the slotted core and the sheath and further a wrapping made of a yarn is wound around the slotted core along with the elongate tape along the slot. While the wrapping serves for friction against displacement of the slotted core, force of drawing the slotted core is only 20N and projection length of the slotted core out of the sheath reaches 36 mm. Further, workability about the midspan access work is inferior to that of the working example 1 as extra work to remove the wrapping is required. Transmission loss is fairly low, 0.21 dB/km.

As being understood from the aforementioned comparisons, the working example 1 in accordance with the present embodiment provides beneficial results as compared with the comparative examples, such as prevention of displacement of the slotted core relative to the sheath, low transmission loss, and excellent workability about the mid-span access work.

The aforementioned embodiment will be modified in various ways. Some of such modifications will be exemplarily described hereinafter. In the following descriptions, differences compared with the aforementioned embodiment will be mainly described and descriptions about elements substantially identical to those of the aforementioned embodiment will be omitted or simplified.

Figure 4:
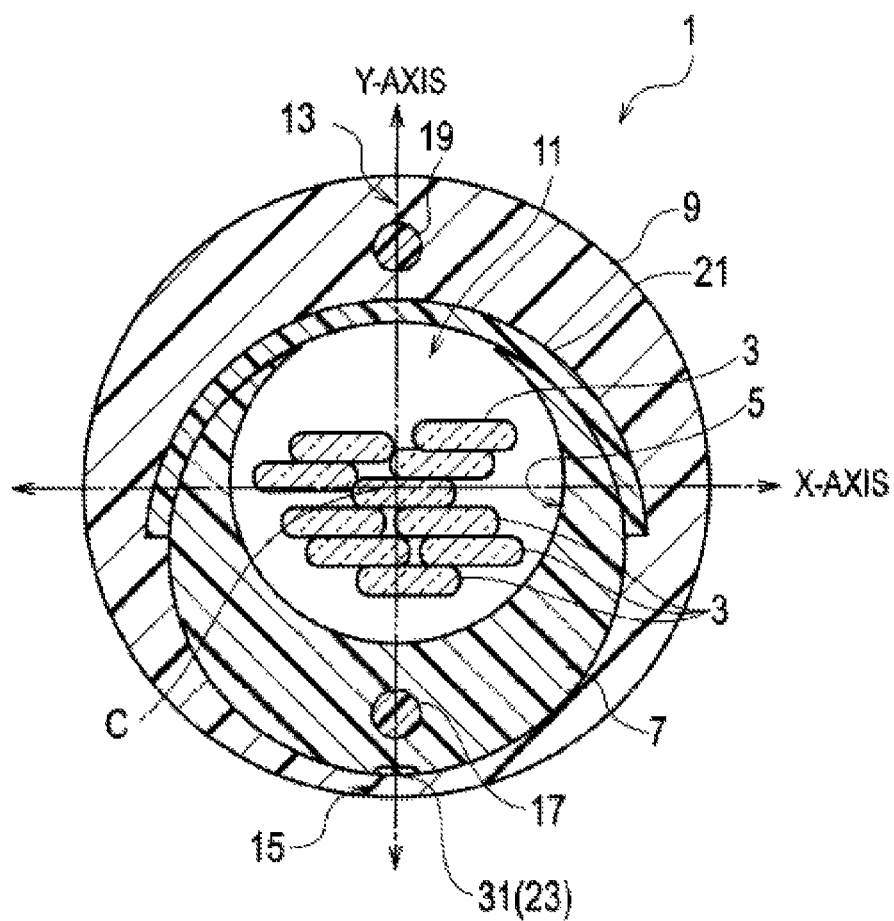
FIG. 4 shows a cross section of an optical fiber cable according to a second embodiment of the present invention.

Referring to FIG. 4 which illustrates a second embodiment, the slotted core 7 is in part given roughness in advance of bonding and the rough surface of the slotted core 7 is subject to thermal fusion bonding to form a bonding portion 23 with the sheath 9. The bonding portion 23 is composed of a thermal fusion bonding portion 31 produced by the thermal fusion bonding, where the slotted core 7 and the sheath 9 are fused together and thereby locally form a unitary body.

Alternatively, in a third embodiment, the slotted core 7 is in part heated up to a temperature sufficiently close to, or higher than, that of the sheath 9 in advance of bonding so as to cause softening of the slotted core 7, and then thermal fusion bonding is carried out.

Figure 5:
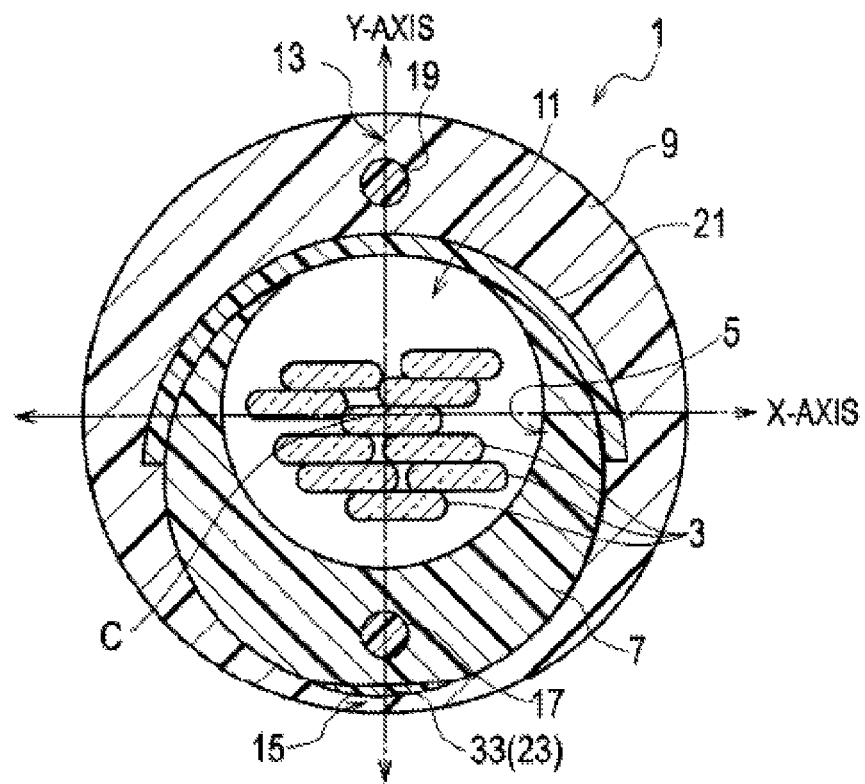
FIG. 5 shows a cross section of an optical fiber cable according to a fourth embodiment of the present invention.

Referring to FIG. 5 which illustrates a fourth embodiment, instead of thermal fusion bonding, a bonding material 33 such as adhesive may be used to form bond between the slotted core 7 and the sheath 9. Therefore the bonding portion 23 is composed of the bonding material 33.

Figure 6:
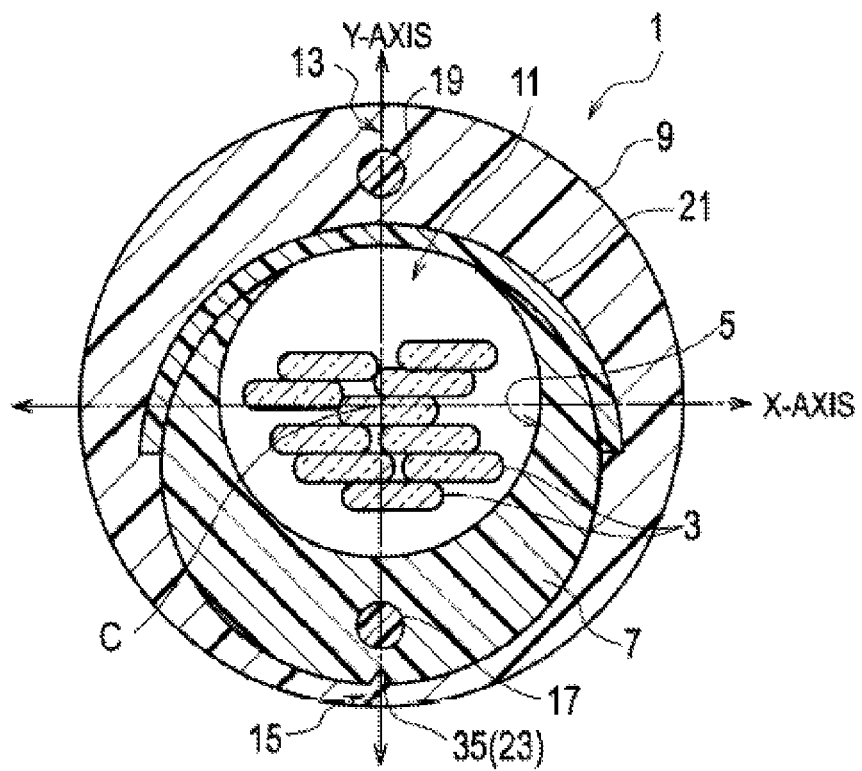
FIG. 6 shows a cross section of an optical fiber cable according to a fifth embodiment of the present invention.

Referring to FIG. 6 which illustrates a fifth embodiment, instead of a projecting rib, a recess 35 receding into the slotted core 7 is formed in advance of bonding and the sheath 9 has a complementary projection. After fitting the projection in the recess 35, thermal fusion bonding is carried out to form a bonding portion 23 therebetween. As with the rib of the first embodiment, the recess 35 may be either a continuous line of a concavity or a row of separate concavities, which longitudinally ranges over the slotted core 7.

Figure 7:
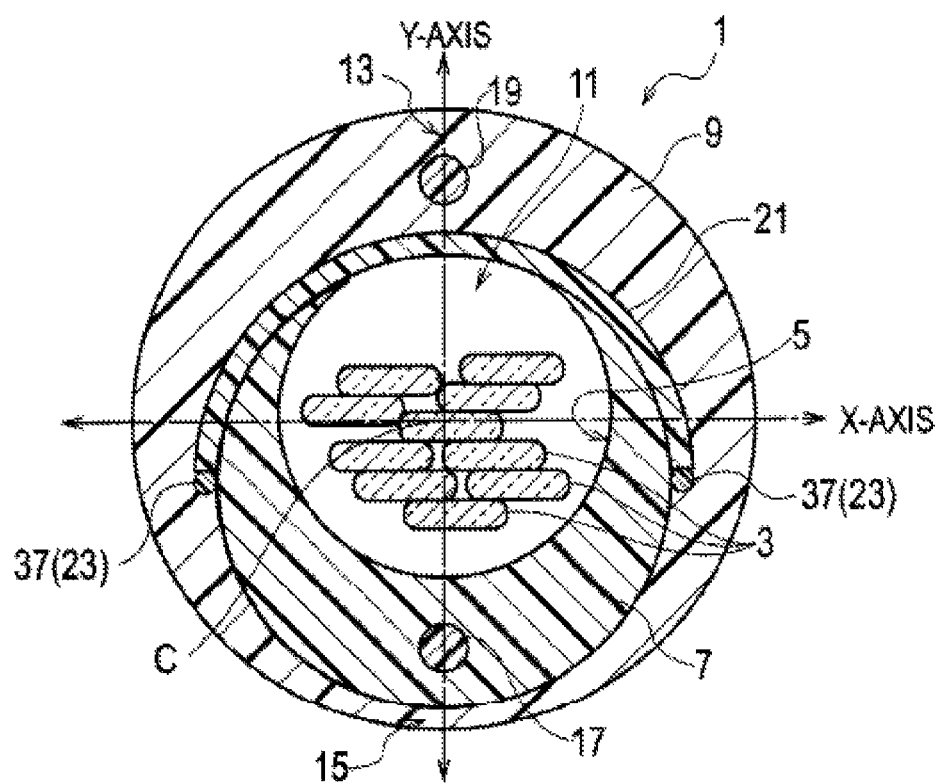
FIG. 7 shows a cross section of an optical fiber cable according to a sixth embodiment of the present invention.

Referring to FIG. 7 which illustrates a sixth embodiment, a pair of rip cords 37 respectively having a bonding material such as adhesive are interposed between the slotted core 7 and the sheath 9. The rip cords 37 are preferably disposed at both sides of the sheath 9, respectively along both edges of the tape 21. By means of the bonding material of the rip cords 37 instead of thermal fusion bonding, the slotted core 7 is bonded with the sheath 9. When the rip cords 37 are drawn, they help to split the sheath as an ordinary rip cord does. As in this way removal of the sheath 9 is further facilitated, one can further easily execute mid-span access work as compared with the first embodiment.

Figure 8:
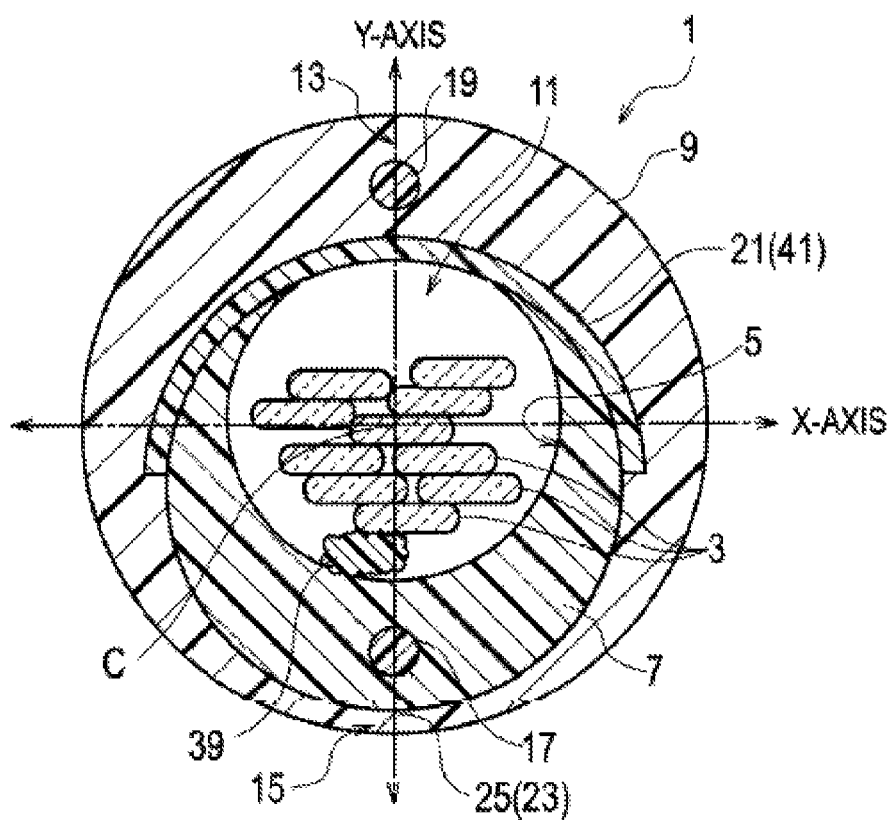
FIG. 8 shows a cross section of an optical fiber cable according to a seventh embodiment of the present invention, which further applies to eighth and ninth embodiments of the present invention.

Referring to FIG. 8 which illustrates a seventh embodiment, one or more absorptive yarns 39 may be housed in the groove 5 of the slotted core 7. The absorptive yarns 39 improve quality of being waterproof of the optical fiber cable 1.

Alternatively, an absorptive tape 41 may be applied instead of, or along with, the elongate tape 21 of the first embodiment. The absorptive tape 41 also improves quality of being waterproof.

Further alternatively, both the absorptive yarns 39 and the absorptive tape 41 may be used. This combination of the absorptive yarns 39 and the absorptive tape 41 further improves quality of being waterproof.

Figure 9:
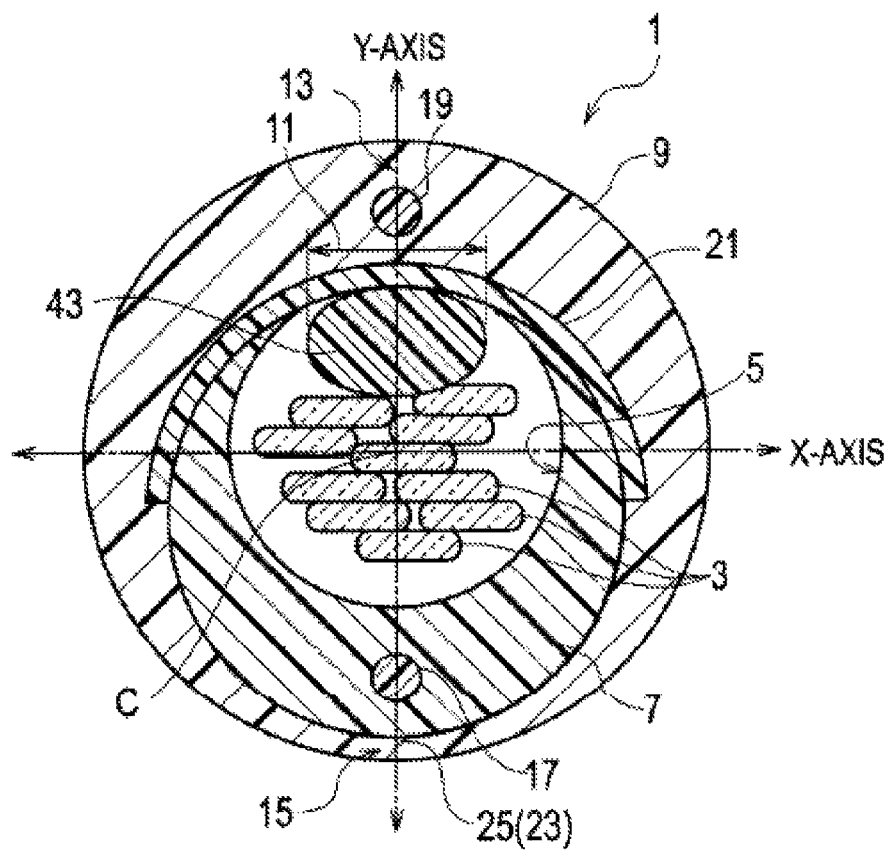
FIG. 9 shows a cross section of an optical fiber cable according to a tenth embodiment of the present invention.
Figure 10:
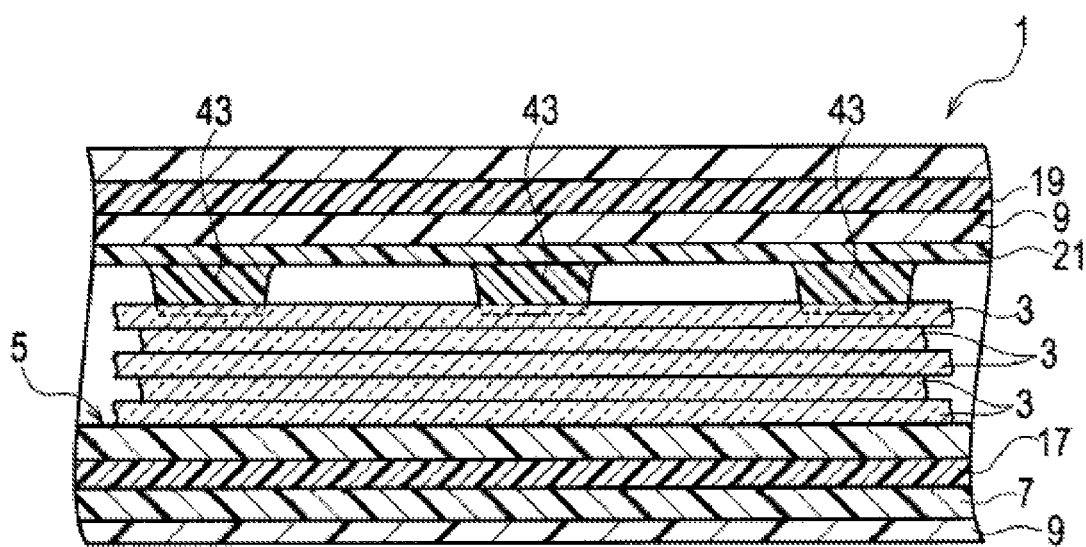
FIG. 10 shows a longitudinal section of the optical fiber taken along the Y-axis of FIG. 9.

Referring to FIGS. 9 and 10 which illustrate a tenth embodiment, anchors 43 are provided in the groove 5 of the slotted core 7. The anchors 43 support one or more of the optical fibers 3 in place. Preferably, the anchors 43 are disposed at intervals in a direction along the central axis C. This structure prevents undesirable force acting on the optical fibers 3 even when the optical fiber cable 1 is deformed. Moreover, the anchors 43 are preferably made of any soft viscous material. Preferably the material is a UV-setting resin having a Young's modulus of 800 MPa or less and a viscosity of 500 cps or more at the normal temperature, whereby preventing undesirable force acting on the optical fibers 3, which may increase transmission loss. Preferably, the intervals of the respective anchors 43 are in a range from 100 mm to 2000 mm, whereby preventing undesirable force acting on the optical fibers 3. Preferably, the support of the optical fibers 3 by the anchors 43 is regulated so that a force required to draw out the supported optical fibers are 5N/10 m or more.

Installation of the anchors 43 is executed in, but not limited to, the following way. The tape 21 is uncoiled and then made to run. An uncured UV-setting resin is intermittently injected onto the running tape 21 substantially at the center thereof. Then the tape 21 along with the uncured UV-setting resin is exposed to UV light so as to cure the UV-setting resin and is subsequently turned around upside down. Thereby the anchors 43 made of the UV-setting resin are disposed at intervals on the lower face of the tape 21. On the other hand, the optical fibers 3 are put in the groove 5 of the slotted core 7 and the slot 11 is made oriented upward. The tape 21 along with the anchors 43 is attached on the slotted core 7 so as to cover the slot 11, whereby the anchors 43 are inserted in the groove 5 to support the optical fibers 3. An extruder may be used to enclose the slotted core 7 with the sheath 9.

Table 2 demonstrates test results of some examples in regard to transmission loss, a drawing test and workability about the mid-span access. The examples 1-8 are in general manufactured in accordance with the aforementioned tenth embodiment and vary in kinds of resin, Young's moduli thereof, and viscosities thereof, as summarized in Table 2.

|  |  | TARGET VALUE | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
| --- | --- | --- | --- | --- | --- | --- | --- | --- | --- | --- |
| CONDITION | FIXATION OF THE OPTICAL FIBER | — | BY A UV RESIN | BY A UV RESIN | BY A UV RESIN | BY A UV RESIN | BY A UV RESIN | BY A UV RESIN | BY A HOT-MELT ADHESIVE | BY A FILLED YARN |
|  | YOUNG'S MODULUS OF THE RESIN (Mpa) | — | 500 | 1000 | 500 | 800 | 1000 | 600 | — | 1000 |
|  | VISCOSITY | — | 300 | 300 | 500 | 500 | 500 | 700 | GREATER | 500 |

-continued

|  |  | TARGET VALUE | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|---|
|  | OF THE RESIN (cps) |  |  |  |  |  |  |  | THAN 10000 |  |
| RESULTS | TRANSMISSION LOSS (dB/km) | LESS THAN 0.25 | 0.22 | 0.28 | 0.21 | 0.23 | 0.32 | 0.20 | 0.32 | 0.86 |
|  | FORCE OF DRAWING THE SLOT CORE (N/10 m) | GREATER THAN 5 | 2.8 | 4.2 | 9.8 | 8.5 | 12 | 11.5 | 4 | 11 |
|  | WORKABILITY | — | EXCELLENT | EXCELLENT | EXCELLENT | EXCELLENT | EXCELLENT | EXCELLENT | TOLERABLE EXTRA WORK FOR REMOVAL OF THE HOT-MELT ADHESION | TOLERABLE (EXTRA WORK FOR REMOVAL OF THE YARN) |

Provided that a target level of performance is set such that a transmission loss is 0.25 dB/km or less, a force required to draw out the slotted core from the sheath is greater than 5, and workability about the mid-span access work is beyond that of existing cables, what meet the target level among the examples are the example 3, 4 and 6, which are commonly comprised of anchors made of the UV-setting resin. Both the example 7 having anchors made of hot-melt adhesive and the example 8 in which yarns filled in the groove fix the optical fibers do not meet the target level.

In more detail, the examples 2, 5 and 8 do not have sufficiently low transmission loss which meets the target level as the Young's moduli of the anchors of these examples reach 1000 MPa. In contrast, the examples 1, 3, 4 and 6 meet the target transmission loss, in which the Young's moduli of the anchors are 800 MPa or less. More specifically, anchor's Young's moduli of 800 MPa or less provide beneficial results in view of suppression of transmission loss.

Further, the examples 1 and 2 in which the viscosities of the anchors are 300 cps do not meet the target force of drawing, whereas the examples 3, 4, 5 and 6 in which the viscosities are 500 cps or more meet the target force of drawing. More specifically, anchor's viscosities of 500 cps or more provide beneficial results in view of prevention of displacement of the slotted core.

Figure 11:
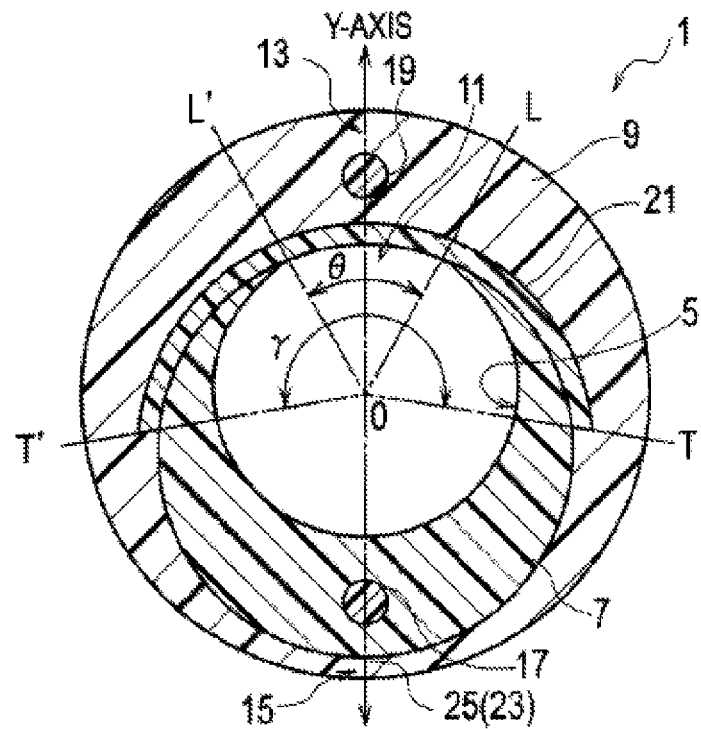
FIG. 11 shows a cross section of an optical fiber cable according to an eleventh embodiment of the present invention.
Figure 12:
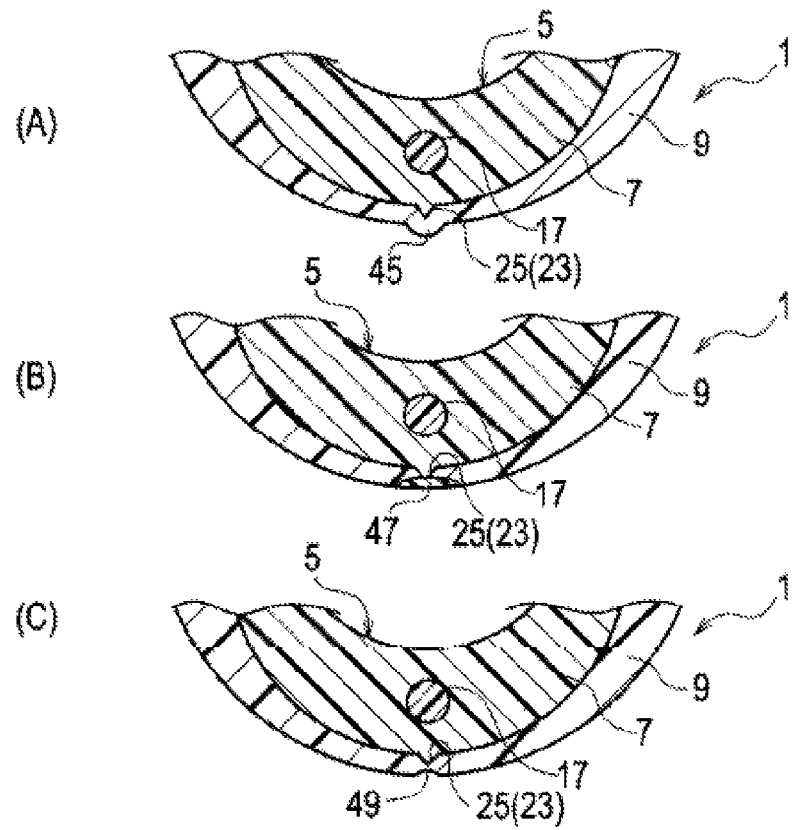
FIGS. 12(A) through 12(C) are partial sectional views to show variations of markers for indicating where a slotted core is fixed with a sheath.

Further modification of the above embodiments will occur. Referring to FIG. 11 which illustrate an eleventh embodiment, widths of the slot 11 in a proper range also beneficial results. A plane emanating from the central axis C in contact with an edge in the right of the slot 11 is shown as a line L in FIG. 11 and another plane emanating from the central axis C in contact with another edge in the left of the slot 11 is shown as a line L'. These planes make an angle "theta" as shown in FIG. 11. When the angle theta is larger than 30 degrees, workability about the mid-span access work becomes easy. Further, when the angle theta is less than 90 degrees, the sheath 9 is prevented from falling into the groove 5 and therefore does not have undesirable influence on transmission loss. More specifically, the angles theta in a range from 30 degrees to 90 degrees provide beneficial results.

Further, widths of the tape 21 in a proper range also beneficial results. A plane emanating from the central axis C in contact with an edge in the right of the tape 21 is shown as a line T in FIG. 11 and another plane emanating from the central axis C in contact with another edge in the left of the tape 21 is shown as a line T'. These planes make an angle "gamma" as shown in FIG. 11. Beneficial results provided by angles gamma larger than the angle theta would be needless to say. When the angle gamma is less than four times the angle theta, the slotted core 7 is securely fixed with the sheath 9 as the slotted core 7 and the sheath 9 ensure sufficient contact area. More specifically, the angles gamma in a range from the angle gamma to four times the angle gamma provide beneficial results.

Referring to FIGS. 12(A)-12(C) which illustrate a twelfth embodiment, the optical fiber cable 1 may be further comprised of a marker for indicating a position of the bonding portion 23. The maker may be a projection 45 projecting from the sheath 9, which is just aligned to the bonding portion 23 as shown in FIG. 12(A). Alternatively, the marker may be a colored bar 47 on the sheath 9 as shown in FIG. 12(B). Further alternatively, the marker may be a concave portion 49 as shown in FIG. 12(C). Existence of the marker helps one who would carry out the mid-span access work to find out where to cut.

Figure 13:
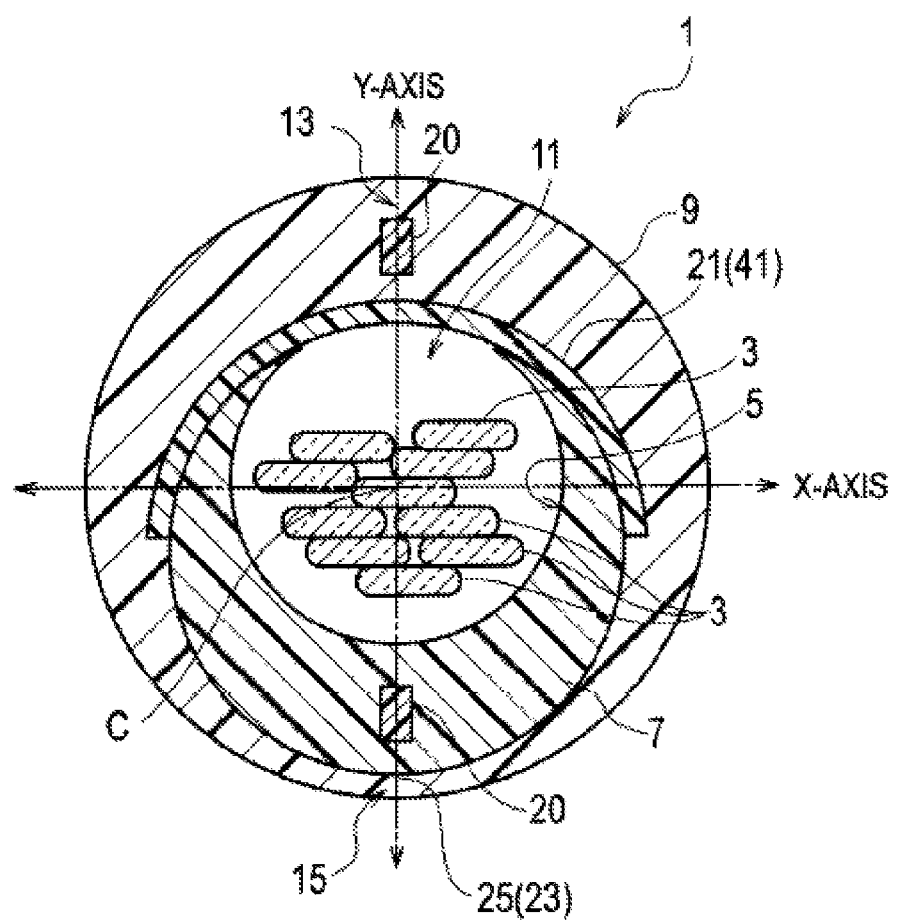
FIG. 13 shows a cross section of an optical fiber according to an embodiment of the present invention, which is replaceable with that of the first embodiment.

Referring to FIG. 13 which illustrates a thirteenth embodiment, a pair of rectangular-prism-shape strength members 20 are embedded respectively in the slotted core 7 and the sheath 9, instead of the columnar strength members 17 and 19 of the first embodiment.

The aforementioned first through thirteenth embodiments are compatible with each other. Therefore, any combination of these embodiments will occur. Further, additional rip cords may be interposed between the slotted core 7 and the sheath 9.

Although the invention has been described above by reference to certain exemplary embodiments of the invention, the invention is not limited to the exemplary embodiments described above. Modifications and variations of the embodiments described above will occur to those skilled in the art, in light of the above teachings.

INDUSTRIAL APPLICABILITY

Optical fiber cables enclosing fibers, in which enclosed fibers are easily accessible but prevented from damage, are provided.

The invention claimed is:
1. An optical fiber cable having an axis, the optical fiber comprising:
   a slotted core elongated along the axis, the slotted core including a slot running in parallel with the axis and a groove accessible through the slot;

one or more optical fibers placed in the groove;
a sheath enclosing the slotted core and the optical fibers;
a bonding portion where the slotted core is bonded with the sheath;
a first strength member embedded in the slotted core and running in parallel with the axis; and
a second strength member embedded in the sheath and running in parallel with the axis,
wherein the first and second strength members are aligned on a plane including the axis.

2. The optical fiber cable of claim 1, wherein the first and second strength members include one selected from the group of steel and FRP.

3. The optical fiber cable of claim 1, wherein a bonding strength at the bonding portion is 98N or more against shearing force in a case of drawing the slotted core from the sheath of 400 mm in length.

4. The optical fiber cable of claim 1, wherein the bonding portion includes a projecting rib projecting from the slotted core.

5. The optical fiber cable of claim 1, wherein the bonding portion includes a binding element interposed between the slotted core and the sheath.

6. The optical fiber cable of claim 1, wherein the bonding portion includes a recess receding in the slotted core.

7. The optical fiber cable of claim 1, wherein the bonding portion includes a string having adhesive interposed between the slotted core and the sheath.

8. The optical fiber cable of claim 1, further comprising:
an absorptive yarn placed in the groove.

9. The optical fiber cable of claim 1, further comprising:
an elongate tape attached on the slotted core to cover the slot.

10. The optical fiber cable of claim 9, wherein the bonding portion is left uncovered by the elongate tape and aligned with the slot and the first and second strength members on the plane.

11. The optical fiber cable of claim 1, further comprising:
one or more anchors configured to support one or more of the optical fibers, the anchors being disposed at intervals in a direction along the axis.

12. The optical fiber cable of claim 11, wherein each of the anchors includes a UV-setting resin having a Young's modulus of 800 MPa or less and a viscosity of 500 cps or more at a normal temperature, each of the intervals between the anchors is in a range from 100 mm to 2000 mm, and a force required to draw out the supported optical fiber is 5N/10 m or more.

13. The optical fiber cable of claim 9, wherein an angle formed by planes emanating from the axis and respectively in contact with edges of the slot of the slotted core is in a range from 30 degrees to 90 degrees, and another angle formed by another planes emanating from the axis and respectively in contact with both edges of the elongate tape.

14. The optical fiber cable of claim 1, wherein the sheath includes nonuniform wall so that a largest thickness of the wall is 1.5 times or more of a smallest thickness of the wall.

15. The optical fiber cable of claim 1, further comprising:
a marker formed on the sheath, the marker indicating a position of the bonding portion.

\* \* \* \* \*